United States Patent
Zhang et al.

(10) Patent No.: US 10,045,014 B2
(45) Date of Patent: Aug. 7, 2018

(54) METHOD OF DISPARITY DERIVED DEPTH CODING IN 3D VIDEO CODING

(71) Applicant: MediaTek Singapore Pte. Ltd., Singapore (SG)

(72) Inventors: Kai Zhang, Beijing (CN); Jicheng An, Beijing (CN); Jian-Liang Lin, Su'ao Township, Yilan County (TW); Xianguo Zhang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 98 days.

(21) Appl. No.: 14/891,129

(22) PCT Filed: Jul. 2, 2014

(86) PCT No.: PCT/CN2014/081460
§ 371 (c)(1),
(2) Date: Nov. 13, 2015

(87) PCT Pub. No.: WO2015/007159
PCT Pub. Date: Jan. 22, 2015

(65) Prior Publication Data
US 2016/0182883 A1    Jun. 23, 2016

(30) Foreign Application Priority Data

Jul. 15, 2013 (WO) ............... PCT/CN2013/079372
Dec. 16, 2013 (WO) ............... PCT/CN2013/089482

(51) Int. Cl.
*H04N 19/105* (2014.01)
*H04N 13/161* (2018.01)
(Continued)

(52) U.S. Cl.
CPC ......... *H04N 13/161* (2018.05); *H04N 19/105* (2014.11); *H04N 19/136* (2014.11);
(Continued)

(58) Field of Classification Search
CPC .................. H04N 13/0048; H04N 19/105
See application file for complete search history.

(56) References Cited

U.S. PATENT DOCUMENTS 5,652,616 A * 7/1997 Chen ................. G06T 9/004
348/42
6,043,838 A * 3/2000 Chen .................. H04N 19/597
348/42
(Continued)

FOREIGN PATENT DOCUMENTS

| CN | 102055982 | 5/2011 |
|---|---|---|
| CN | 102215414 | 10/2011 |
| JP | 2013-106337 | 5/2013 |

OTHER PUBLICATIONS

International Search Report dated Jul. 2, 2014, issued in application No. PCT/CN2014/081460.

*Primary Examiner* — Jaynati K Patel
*Assistant Examiner* — Irfan Habib
(74) *Attorney, Agent, or Firm* — Oblon, McClelland, Maier & Neustadt, L.L.P.

(57) ABSTRACT

A method and apparatus for three-dimensional video encoding and decoding using disparity derived depth prediction are disclosed. Embodiments of the present invention determine a disparity vector related to a collocated texture block in the dependent view and generate converted depth samples from the disparity vector. The generated converted depth samples are used as a predictor or Merge candidate for the current depth block. The Merge candidate corresponding to the converted depth samples can be placed in the merging candidate list at a location before TMVP (temporal motion vector predictor) merging candidate. The converted depth samples can be generated from the disparity vector according to a function of the disparity vector. Information associated with the function can be signaled explicitly to a
(Continued)

decoder or derived implicitly by the decoder. One aspect of the present invention addresses simplified disparity to depth conversion, specifically division-free disparity-to-depth conversion.

18 Claims, 2 Drawing Sheets

(51) Int. Cl.
*H04N 19/597* (2014.01)
*H04N 19/176* (2014.01)
*H04N 19/46* (2014.01)
*H04N 19/136* (2014.01)
*H04N 19/44* (2014.01)
*H04N 19/52* (2014.01)
*H04N 13/00* (2018.01)

(52) U.S. Cl.
CPC ........... *H04N 19/176* (2014.11); *H04N 19/44* (2014.11); *H04N 19/46* (2014.11); *H04N 19/52* (2014.11); *H04N 19/597* (2014.11); *H04N 2013/0081* (2013.01)

(56) References Cited

U.S. PATENT DOCUMENTS

| | | | | |
|---|---|---|---|---|
| 6,055,274 A * | 4/2000 | McVeigh | H04N 19/597 | 348/43 |
| 6,691,275 B1 * | 2/2004 | Jaeckel | H03M 5/145 | 341/59 |
| 8,139,150 B2 * | 3/2012 | Nakamura | H04N 19/597 | 348/409.1 |
| 8,274,551 B2 * | 9/2012 | Kim | H04N 13/0022 | 348/42 |
| 8,462,196 B2 * | 6/2013 | Kim | H04N 13/0029 | 345/204 |
| 8,532,410 B2 * | 9/2013 | Tian | H04N 19/597 | 382/232 |
| 8,625,969 B2 | 1/2014 | Fujita et al. | | |
| 8,953,684 B2 * | 2/2015 | Cai | H04N 19/597 | 375/240.16 |
| 9,215,445 B2 * | 12/2015 | Horlander | H04N 13/0048 | |
| 9,258,562 B2 * | 2/2016 | Zhang | H04N 19/597 | |
| 9,319,657 B2 * | 4/2016 | Kang | H04N 13/0048 | |
| 9,357,197 B2 * | 5/2016 | Chen | H04N 13/0048 | |
| 9,363,500 B2 * | 6/2016 | Takahashi | H04N 19/597 | |
| 9,380,289 B2 * | 6/2016 | Chen | H04N 19/70 | |
| 9,402,066 B2 * | 7/2016 | Jeong | H04N 19/597 | |
| 9,445,076 B2 * | 9/2016 | Zhang | H04N 13/0048 | |
| 9,473,752 B2 * | 10/2016 | Chen | H04N 13/0003 | |
| 9,503,702 B2 * | 11/2016 | Chen | H04N 13/0048 | |
| 9,596,448 B2 * | 3/2017 | Thirumalai | H04N 19/597 | |
| 9,667,942 B2 * | 5/2017 | Chen | H04N 13/0048 | |
| 9,712,819 B2 * | 7/2017 | Sung | H04N 19/597 | |
| 9,900,576 B2 * | 2/2018 | Thirumalai | H04N 19/597 | |
| 9,906,768 B2 * | 2/2018 | Chen | H04N 13/0048 | |
| 2010/0195898 A1 * | 8/2010 | Bang | G06T 5/50 | 382/154 |
| 2011/0069760 A1 * | 3/2011 | Lee | H04N 5/145 | 375/240.16 |
| 2011/0096832 A1 * | 4/2011 | Zhang | H04N 13/0022 | 375/240.08 |
| 2011/0142138 A1 * | 6/2011 | Tian | H04N 13/0022 | 375/240.24 |
| 2011/0216833 A1 * | 9/2011 | Chen | H04N 13/0022 | 375/240.16 |
| 2013/0287093 A1 * | 10/2013 | Hannuksela | H04N 19/00769 | 375/240.02 |
| 2013/0335527 A1 * | 12/2013 | Takahashi | H04N 19/597 | 348/43 |
| 2014/0341289 A1 * | 11/2014 | Schwarz | H04N 19/597 | 375/240.16 |
| 2015/0146786 A1 * | 5/2015 | Uchiumi | H04N 19/597 | 375/240.16 |
| 2015/0201214 A1 * | 7/2015 | Lin | H04N 19/597 | 348/42 |
| 2015/0237324 A1 * | 8/2015 | Zhang | H04N 13/0048 | 375/240.24 |
| 2015/0249838 A1 * | 9/2015 | Chang | H04N 19/597 | 375/240.16 |
| 2015/0264356 A1 * | 9/2015 | Zhang | H04N 19/119 | 375/240.08 |
| 2015/0264399 A1 * | 9/2015 | Lin | H04N 19/597 | 375/240.12 |
| 2015/0382025 A1 * | 12/2015 | Gu | H04N 19/182 | 375/240.24 |
| 2016/0057453 A1 * | 2/2016 | Chang | H04N 19/597 | 375/240.12 |
| 2016/0088297 A1 * | 3/2016 | Svedberg | G10L 19/00 | 375/240.03 |
| 2016/0100190 A1 * | 4/2016 | Zhang | H04N 19/597 | 348/43 |

* cited by examiner

METHOD OF DISPARITY DERIVED DEPTH CODING IN 3D VIDEO CODING

CROSS REFERENCE TO RELATED APPLICATIONS

The present invention is a National Phase Application of PCT Application No. PCT/CN2014/081460, filed on Jul. 2, 2014, which claims priority to PCT Patent Application Serial No. PCT/CN2013/079372, filed on Jul. 15, 2013, entitled "A Disparity Derived Depth Coding Method" and PCT Patent Application Serial No. PCT/CN2013/089482, filed on Dec. 16, 2013, entitled "An Approximation Method for Division Operation". The PCT Patent Applications are hereby incorporated by reference in their entireties.

FIELD OF THE INVENTION

The present invention relates to three-dimensional video coding. In particular, the present invention relates depth coding using disparity derived depth prediction in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing. For 3D coding, depth maps are also coded along with the texture data.

In the 3D-HEVC standard (three-dimensional video coding based on High Efficiency Video Coding (HEVC) standard) being developed, depth samples are used to derive disparity vectors for texture component coding as specified in 3D-HEVC Test Model 4 (Joint Collaborative Team on 3D Video Coding Extension Development of ITU-T SG 16 WP 3 and ISO/IEC JTC 1/SC 29/WG 11 4th Meeting: Incheon, KR, 20-26 Apr. 2013, Document: JCT3V-D1005). A disparity vector (DVx, 0) can be derived from its corresponding depth value (dep) by a linear relationship as:

$$DVx = w \cdot dep + b, \quad (1)$$

where w and b are two camera parameters, w is referred as a depth-conversion scale factor and b is referred as a depth-conversion offset in this disclosure. In 3D-HEVC, equation (1) is implemented in an integer form, and parameters w and b can be conveyed from the encoder to the decoder. The disparity vector is assumed to have zero vertical disparity value for multiple cameras configured horizontally. Similar equation can be developed for other camera configuration.

In the current 3D-HEVC, additional merging candidates, such as the backward view synthesis prediction (BVSP) candidate, the inter-view merging candidates, the disparity vector candidate, and the texture candidate are included in the merging candidate list for dependent-view texture coding or depth coding. BVSP utilizes depth samples of the depth component to derive disparity vectors for texture component coding. In addition, two inter-view merging candidates are adopted into the merging candidate list at the first position and the position before the temporal motion vector prediction (TMVP) candidate in texture coding. These two candidates inherit motion parameters from the center position (110) and the below-right position (120) of the collocated PU (130) in the reference inter-view picture respectively as depicted in FIG. 1. Similarly, a texture merging candidate is adopted into the merging candidate list at position 0 (i.e., the highest priority position) in depth coding, which inherits motion parameters from the center position of the collocated PU in the reference texture picture.

In the conventional approach, the depth information is used to derive disparity for texture coding. However, the disparity information is not used to help depth coding.

BRIEF SUMMARY OF THE INVENTION

A method and apparatus for three-dimensional video encoding and decoding using disparity derived depth prediction are disclosed. Embodiments of the present invention determine a disparity vector related to a collocated texture block in the dependent view and generate converted depth samples from the disparity vector. The generated converted depth samples are used as a predictor or Merge candidate for the current depth block. The Merge candidate corresponding to the converted depth samples can be placed in the merging candidate list at a location immediately after the texture merging candidate. The merging candidate list may also include an additional texture merging candidate, which inherits motion parameters of texture data at a below-right location of the collocated texture block. The additional texture merging candidate can be placed in the merging candidate list at a location before the TMVP (temporal motion vector predictor) merging candidate.

The converted depth samples can be generated from the disparity vector according to a function of the disparity vector. Information associated with the function can be signaled explicitly to a decoder or derived implicitly by the decoder. One aspect of the present invention addresses simplified disparity to depth conversion, specifically division-free disparity-to-depth conversion. In one embodiment, generating the converted depth samples from the disparity vector includes multiplying disparity value of the disparity vector by a first integer and adding a second integer to obtain a first result, and right shifting the first result by a third integer to generate the converted depth samples. The first integer, the second integer and the third integer can be signaled explicitly to a decoder or derived implicitly by the decoder.

In another embodiment, the converted depth samples correspond to sign-modified converted depth samples multiplied by a first sign part, the modified converted depth samples are generated from the disparity vector by multiplying the disparity value of the disparity vector by a fourth integer and adding a fifth integer to obtain a second result, and right shifting the second result by a sixth integer to generate the modified converted depth samples. The fourth integer, the fifth integer and the sixth integer correspond to the first integer, the second integer and the third integer multiplied by the first sign part. The first sign part corresponds to the sign part of the depth-conversion scale factor for depth-to-disparity conversion. The fourth integer is determined based on a depth-conversion scale factor for depth-to-disparity conversion and the fourth integer is selected to be 2 raised to a power of a seventh integer. The seventh integer corresponds to a sum of an eighth integer and a ninth integer, where the eighth integer corresponds to data precision of the depth-conversion scale factor and the depth-conversion for the depth-to-disparity conversion, and the ninth integer corresponds to bit depth of depth samples of the current depth block. The sixth integer corresponds to a sum of the seventh integer, a tenth integer and 1, wherein the tenth integer corresponds to a largest integer not greater than the depth-conversion scale factor for the depth-to-disparity conversion. The fifth integer is determined based on both depth-conversion scale factor and depth-conversion offset for depth-to-disparity conversion.

The information associated with the disparity vector can be signaled explicitly to a decoder or derived implicitly by the decoder. The disparity vector related to the collocated texture block can be determined from the disparity vector of a selected position of the collocated texture block corresponding to a center, left above, right bottom, right above or left bottom location of the collocated texture block. The disparity vector of the collocated texture block can be a derived disparity vector based on neighboring block disparity vector (NBDV) or depth-oriented NBDV (DoNBDV) of the collocated texture block. The current depth block can be further divided into depth sub-blocks, and for each depth sub-block, the converted depth samples generated from the disparity vector of a corresponding sub-block of the collocated texture block are used as a predictor for the depth sub-block.

DETAILED DESCRIPTION OF THE INVENTION

The following description is of the best-contemplated mode of carrying out the invention. The description is intended for the purpose of illustrating the general principles of the invention and shall not be construed as limitation to the invention. The scope of the invention is best determined by reference to the appended claims.

While the conventional approach only derives disparity from the depth information for 3D coding, the present invention derives depth information based on disparity and utilizes the converted depth for depth coding. Accordingly, a disparity derived depth (DDD) coding method is disclosed to improve the coding efficiency for the depth component. It can be observed from equation (1) that the conversion between a depth value, dep and a disparity value, DVx is reversible. Thus, a depth value can also be derived from its corresponding disparity vector (DVx, DVy) as:

$$dep = \frac{1}{w} \cdot DVx - \frac{b}{w}, \qquad (2)$$

where the disparity value for the vertical component is assumed to be 0 (i.e., DVy=0) in equation (2). When the vertical disparity value of the disparity vector is not 0, the conversion from disparity to depth can be derived similarly. For convenience, the examples illustrated in this disclosure always assume that the vertical disparity value is 0. Nevertheless, this should not be construed as limitations to the present invention.

Figure 2:
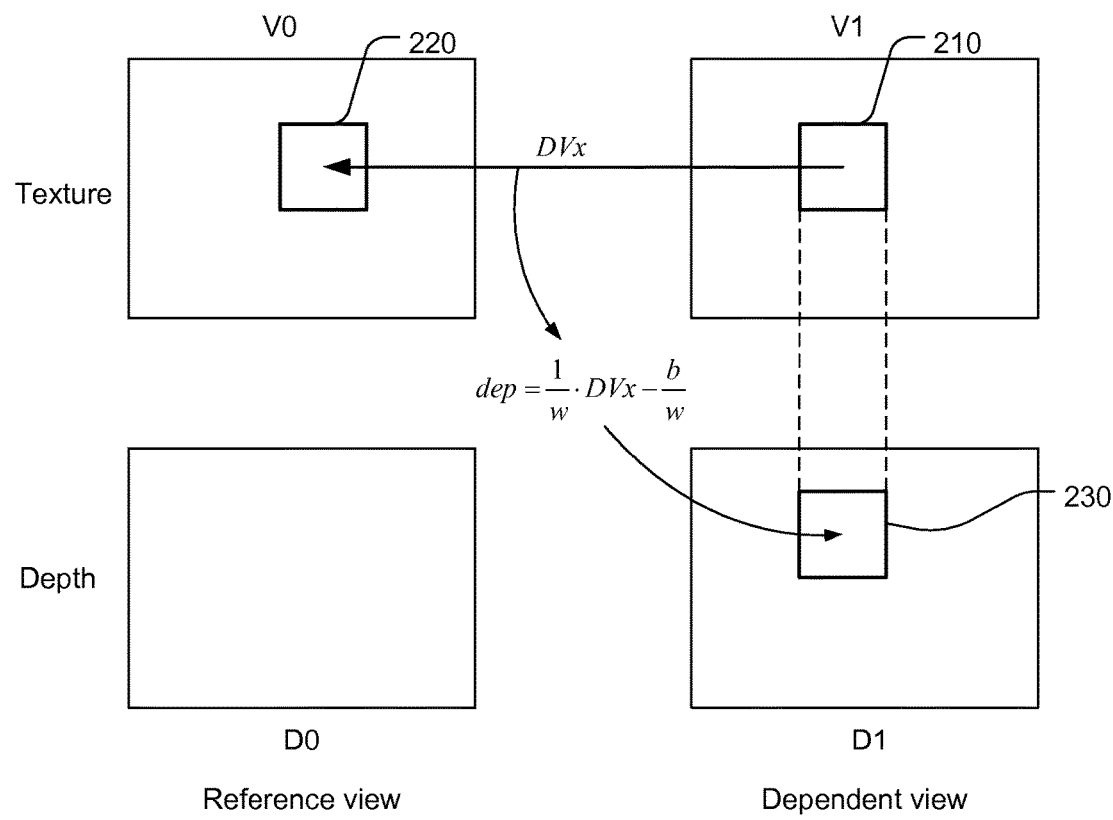
FIG. 2 illustrates an exemplary process of disparity derived depth for depth coding according to the present invention.

When the collocated texture block of the current depth block is predicted by disparity-compensated prediction (DCP), a disparity derived depth (DDD) candidate can be inserted into the merging candidate list for depth coding. For example, the DDD candidate can be place in a location immediately after the texture candidate. For a DDD candidate, all prediction samples in the current block are set as dep calculated according to equation (2). For performing equation (2) efficiently, all the operations can be implemented in an integer form. FIG. 2 illustrates an example of the procedure for deriving a depth value from its corresponding disparity vector. In FIG. 2, the disparity vector (DVx) between the current texture block (210) in a dependent view (V1) and a corresponding block (220) in a reference view can be determined. The depth block (230) collocated with the current texture block (210) in the dependent view is to be coded. The predictor for the collocated depth block (230) can be derived using DVx according to equation (2). It should be noted that the DDD candidate is invalid on the base view since DCP is applied only to dependent views.

The DDD procedure involves division operations as shown in equation (2). Since the division operation involves higher complexity in both hardware based and software based implementations, it is desirable to develop equivalent operations without the need of the division operation as shown in equation (3).

$$dep = (a*DVx+b) >> s \qquad (3)$$

where a is a first integer to scale the disparity value (i.e., DVx), b is a second integer used as an offset, and s corresponds to a third integer used for arithmetic right shifting the first result corresponding to (a*DVx+b).

Therefore, in another embodiment of the present invention, equation (2) is implemented without the need to perform the division operation. In other words, division-free operations are developed for implementing equation (2). First, equation (2) can be rewritten as:

$$dep = \text{sign}(w)\left(\frac{1}{|w|} \cdot DVx - \frac{b}{|w|}\right). \qquad (4)$$

As mentioned before, w is the depth-conversion scale factor and b is the depth-conversion offset. As shown in equation (4), the converted depth values is represented by a sign part (i.e., sign(w)) and the rest part (i.e., the part in the parenthesis in right-hand side equation (4)). The rest part in equation (4) can be represented as:

$$\frac{1}{|w|} \cdot DVx - \frac{b}{|w|} = \frac{k}{|w|k} \cdot DVx - \frac{bk}{|w|k}. \qquad (5)$$

A new parameter, $\Omega$ is introduced, where $\Omega=\lfloor \log_2|w|\rfloor$ and $\lfloor x \rfloor$ represents the floor function of x corresponding to the largest integer not greater than x. An example of derivation of parameter $\Omega$ is shown in the following the C-style pseudo codes as:

```
Ω=0;
while( ((( 1 <<Ω) << 1 ) <= |w| ) )
    Ω++;
```

In the above pseudo codes, $(1<<\Omega)$ means arithmetic left shifting the value of "1" by "$\Omega$". In other words, the operation will result in a value, $2^\Omega$. Thus, the relationship between parameters w and $\Omega$ is shown as below, $$2^\Omega \le |w| < 2^{\Omega+1}. \qquad (6)$$

In other words, $\Omega$ is an integer that causes the relationship in equation (6) satisfied. Therefore, for k satisfying $$2^M < k \le 2^{M+1}, \qquad (7)$$

it can be derived that, $$2^{M+\Omega} < k|w| < 2^{M+\Omega+2}. \quad (8)$$

For k from $2^M$ to $2^{M+1}$ inclusively, there exists a k* causing k|w| as close as possible to $2^{M+\Omega+1}$, but not exceeding. The k*, denoted as $\alpha$, can be obtained according to the C-style pseudo codes as follows:

```
E_min = |(2^M|w|−2^(M+Ω +1))|
α = 2^M
for(k =2^M; k<=2^(M+1); k++ )
    if(|k|w|−2^(M+Ω +1)|<E_min){
        E_min = |k|w|−2^(M+Ω +1)|
        α = k;
    }
```

Therefore, equation (4) can be derived as, $$\frac{1}{|w|} \cdot DVx - \frac{b}{|w|} = \frac{\alpha}{|w|\alpha} \cdot DVx - \frac{b\alpha}{|w|\alpha} \approx \quad (9)$$

$$\frac{\alpha}{2^{M+\Omega+1}} \cdot DVx - \frac{\alpha b}{2^{M+\Omega+1}} = \frac{\alpha \cdot DVx - \alpha b}{2^{M+\Omega+1}}.$$

The division by (2 raised to the power of an integer (i.e., $M+\Omega+1$)) in equation (9) can be calculated without any division operation since the division by (2 raised to the power of an integer) can be implemented as arithmetic right shift by the integer as shown below:

$$\frac{\alpha \cdot DVx - \alpha b}{2^{M+\Omega+1}} \approx (\alpha \cdot DVx - \alpha b + \beta) >> (M+\Omega+1), \quad (10)$$

where $\beta$ is an offset value.

In the one embodiment, $\beta$ is set equal to $1<<(M+\Omega)$. In another embodiment, $\beta$ is set equal to $(1<<(M+\Omega))+\gamma Q$, where $$\gamma = \begin{cases} 1 & \text{if } \alpha|w| < 2^{M+\Omega+1} \\ -1 & \text{if } \alpha|w| > 2^{M+\Omega+1} \\ 0 & \text{if } \alpha|w| = 2^{M+\Omega+1} \end{cases}, \quad (11)$$

and Q is a positive integer. In yet another embodiment, Q is set equal to $(1<<(M+\Omega-4))$.

From equations (4) and (10), equation (2) can be calculated approximately without a division as, $$dep \approx sign(w)[(\alpha \cdot DVx - \alpha b + \beta) >> (M+\Omega+1)], \quad (12)$$

According to equation (12), the depth value can be converted from the disparity value multiplying the sign part (i.e., sign(w)) with the rest part in the bracket on the right side of equation (12). The rest part can be implemented by multiplying the disparity value (i.e., DVx) by a fourth integer (i.e., $\alpha$) and adding a fifth integer (i.e., $-\alpha b+\beta$) to obtain a second result. The second result is then arithmetic right shifted by a sixth integer (i.e., $(M+\Omega+1)$). In another embodiment, the precision of w and b is taken into consideration. For example, (1) can be rewritten as, $$DVx = (w \cdot dep + (b << q) + \text{offset}) >> (p+q), \quad (13)$$

where p is the precision of w and b, q is the bit-depth of dep samples, which is usually 8. Offset is set to $1<<(p+q-1)$.

It can be derived from equations (12) and (13) that $$dep = \frac{2^{p+q}}{w} \cdot DVx - \frac{2^q b}{w} = \frac{1}{w} \cdot DVx' - \frac{b'}{w}, \quad (14)$$

where $DVx' = 2^{p+q}DVx$ and $b' = 2^q b$.

Following similar derivation as above, equation (14) can be calculated approximately without a division as $$dep \approx sign(w)[(\alpha \cdot DVx' - \alpha b' + \beta) >> (M+\Omega+1)] = \quad (14)$$

$$sign(w)[((\alpha << (p+q)) \cdot DVx - (\alpha << q)b + \beta) >> (M+\Omega+1)].$$

While various examples of division-free disparity-to-depth conversion as shown above, these examples are not meant for an exhaustive illustration of the present invention. A skill person in the art may practice the present invention using other similar formulas without departing from the spirit of the present invention. For example, while the arithmetic right shifting is applied to the sum of scaled disparity (i.e., $\alpha \cdot DVx$) and offset (i.e., $-\alpha b+\beta$), the arithmetic right shifting may also be applied to the scaled disparity and the offset separately the right-shifted results are added together.

Figure 1:
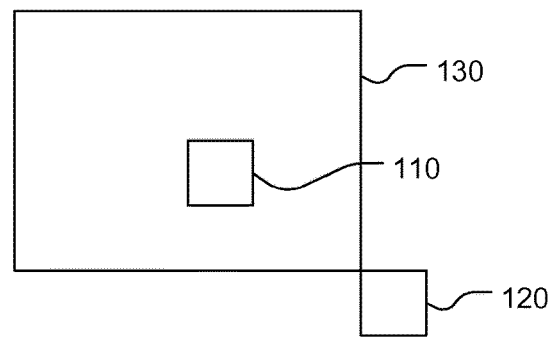
FIG. 1 illustrates an example of locations used to determine a disparity vector for a texture block or a collocated texture block of a corresponding depth block.

In another embodiment of the present invention, an additional texture merging candidate is inserted into the merging candidate list for depth coding. The additional texture merging candidate is similar to the inter-view merging candidate for the depth coding. The additional texture merging candidate inherits motion parameters from the below-right position of the collocated PU in the reference texture picture as shown in FIG. 1. The additional texture merging candidate can be inserted into the merging candidate list in a designated location. For example, it is inserted into the merging candidate list before TMVP after pruning the first merging candidate.

The performance of a 3D video coding system incorporating the DDD merging candidate according to an embodiment of the present invention is compared to the performance of a conventional system as shown in Table 1, where the conventional system corresponds to a system based on 3D-HEVC Test Model version 8.0 and the system according to the present invention inserts the DDD merging candidate into the merging candidate list right after the texture candidate. The performance comparison is based on different sets of test data listed in the first column. The BD-rate differences are shown for texture pictures in view 1 (video 1) and view 2 (video 2). A negative value in the BD-rate implies that the present invention has a better performance. The BD-rate measure for the coded video PSNR with video bitrate, the coded video PSNR with total bitrate (texture bitrate and depth bitrate), and the synthesized video PSNR with total bitrate are also shown. As shown in Table 1, there is a 0.2% performance improvement for the synthesized view. For others, the performance is about the same. The processing times (encoding time, decoding time and rendering time) are also compared. As shown in Table 1, the processing times are roughly the same (less than 1% variation).

TABLE 1

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | 0.0% | 0.0% | 0.0% | −0.1% | 99.5% | 103.3% | 97.1% |
| Kendo | 0.0% | 0.0% | 0.0% | 0.0% | 0.0% | −0.1% | 99.4% | 100.5% | 101.2% |
| Newspapercc | 0.0% | 0.0% | 0.0% | 0.0% | 0.0% | −0.1% | 99.1% | 96.9% | 99.9% |
| GhostTownFly | 0.0% | 0.0% | 0.0% | 0.0% | 0.0% | −0.8% | 99.7% | 109.5% | 102.0% |
| PoznanHall2 | 0.0% | 0.0% | 0.0% | 0.0% | 0.0% | 0.0% | 100.1% | 96.9% | 100.4% |
| PoznanStreet | 0.0% | 0.0% | 0.0% | 0.0% | 0.0% | −0.1% | 100.2% | 97.6% | 100.0% |
| UndoDancer | 0.0% | 0.0% | 0.0% | 0.0% | 0.0% | −0.1% | 100.2% | 99.6% | 100.7% |
| 1024 × 768 | 0.0% | 0.0% | 0.0% | 0.0% | 0.0% | −0.1% | 99.3% | 100.2% | 99.4% |
| 1920 × 1088 | 0.0% | 0.0% | 0.0% | 0.0% | 0.0% | −0.3% | 100.0% | 100.9% | 100.8% |
| average | 0.0% | 0.0% | 0.0% | 0.0% | 0.0% | −0.2% | 99.7% | 100.6% | 100.2% |

The performance of a 3D video coding system incorporating the additional texture candidate for depth coding according to another embodiment of the present invention is compared to the performance of a conventional system as shown in Table 2, where the conventional system corresponds to a system based on 3D-HEVC Test Model version 8.0 and the system according to the present invention inserts the additional texture merging candidate into the merging candidate list before TMVP after pruning with the first merging candidate. As shown in Table 2, there is a 0.1% performance improvement for the synthesized view. For others, the performance is about the same. The processing times are lower for the encoding time and decoding time (99.5% and 99.4%) and rendering time is slightly higher (101.2%).

TABLE 2

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | 0.0% | 0.0% | 0.0% | −0.1% | 100.1% | 108.9% | 100.2% |
| Kendo | 0.0% | 0.1% | 0.0% | 0.0% | 0.0% | −0.1% | 99.3% | 92.6% | 100.6% |
| Newspapercc | 0.0% | 0.1% | 0.1% | 0.0% | 0.0% | −0.1% | 100.8% | 99.5% | 101.8% |
| GhostTownFly | 0.0% | 0.0% | −0.1% | 0.0% | −0.1% | −0.1% | 98.0% | 100.1% | 105.9% |
| PoznanHall2 | 0.0% | 0.1% | 0.0% | 0.0% | 0.0% | −0.1% | 100.2% | 103.8% | 100.3% |
| PoznanStreet | 0.0% | 0.1% | 0.1% | 0.0% | 0.0% | −0.1% | 98.6% | 95.2% | 100.5% |
| UndoDancer | 0.0% | 0.1% | 0.0% | 0.0% | 0.0% | 0.0% | 99.3% | 95.4% | 98.6% |
| 1024 × 768 | 0.0% | 0.0% | 0.0% | 0.0% | 0.0% | −0.1% | 100.0% | 100.4% | 100.9% |
| 1920 × 1088 | 0.0% | 0.1% | 0.0% | 0.0% | 0.0% | 0.0% | 99.0% | 98.6% | 101.3% |
| average | 0.0% | 0.1% | 0.0% | 0.0% | 0.0% | −0.1% | 99.5% | 99.4% | 101.2% |

The performance of a 3D video coding system incorporating both the DDD merging candidate and the additional texture merging candidate for depth coding according to an embodiment of the present invention is compared to the performance of a conventional system as shown in Table 3, where the conventional system corresponds to a system based on 3D-HEVC Test Model version 8.0. As shown in Table 3, there is a 0.2% performance improvement for the synthesized view. However, for video 1, there is about a 0.1% increase in BD-rate. For others, the performance is about the same. The processing times increase slightly ranging from 0.2% to 1.6%.

TABLE 3

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | 0.0% | 0.0% | 0.0% | −0.1% | 100.4% | 106.4% | 99.2% |
| Kendo | 0.0% | 0.1% | 0.0% | 0.0% | −0.1% | −0.2% | 100.4% | 103.4% | 102.9% |
| Newspapercc | 0.0% | 0.1% | 0.1% | 0.0% | −0.1% | −0.2% | 99.9% | 101.3% | 98.5% |
| GhostTownFly | 0.0% | 0.0% | −0.1% | 0.0% | 0.0% | −0.9% | 100.2% | 98.6% | 102.0% |
| PoznanHall2 | 0.0% | 0.1% | 0.0% | 0.0% | 0.0% | −0.1% | 100.3% | 106.1% | 98.4% |
| PoznanStreet | 0.0% | 0.1% | 0.1% | 0.0% | 0.0% | −0.2% | 100.0% | 95.6% | 98.6% |
| UndoDancer | 0.0% | 0.1% | 0.0% | 0.0% | 0.0% | −0.1% | 101.3% | 100.1% | 101.8% |
| 1024 × 768 | 0.0% | 0.0% | 0.0% | 0.0% | 0.0% | −0.2% | 100.2% | 103.7% | 100.2% |
| 1920 × 1088 | 0.0% | 0.1% | 0.0% | 0.0% | 0.0% | −0.3% | 100.5% | 100.1% | 100.2% |
| average | 0.0% | 0.1% | 0.0% | 0.0% | 0.0% | −0.2% | 100.4% | 101.6% | 100.2% |

The performance of a 3D video coding system incorporating both the DDD merging candidate and the additional texture merging candidate for depth coding according to an embodiment of the present invention is compared to the performance of a conventional system as shown in Table 4. The system for an embodiment of the present invention is similar to the embodiment in Table 3 except that the candidate pruning is used for the system in Table 4. As shown in Table 4, there is a 0.3% performance improvement for the synthesized view. The processing time is decreased for encoding (0.3%) and increases slightly for decoding and rendering times (1.4% and 2.5 respectively).

TABLE 4

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.0% | 0.1% | 0.0% | 0.0% | −0.1% | 99.4% | 105.2% | 102.8% |
| Kendo | 0.0% | 0.0% | 0.0% | 0.0% | −0.1% | −0.2% | 99.4% | 102.1% | 105.1% |
| Newspapercc | 0.0% | 0.0% | 0.0% | 0.0% | −0.1% | −0.2% | 98.6% | 100.7% | 100.2% |
| GhostTownFly | 0.0% | 0.1% | −0.1% | 0.0% | 0.0% | −0.9% | 99.5% | 97.9% | 102.6% |
| PoznanHall2 | 0.0% | 0.0% | 0.2% | 0.1% | 0.1% | −0.1% | 100.0% | 102.8% | 101.4% |
| PoznanStreet | 0.0% | 0.1% | 0.1% | 0.0% | 0.0% | −0.2% | 100.5% | 102.9% | 101.9% |
| UndoDancer | 0.0% | 0.1% | −0.1% | 0.0% | 0.0% | −0.1% | 100.5% | 98.6% | 103.4% |
| 1024 × 768 | 0.0% | 0.0% | 0.0% | 0.0% | −0.1% | −0.2% | 99.1% | 102.7% | 102.7% |
| 1920 × 1088 | 0.0% | 0.1% | 0.0% | 0.0% | 0.0% | −0.3% | 100.1% | 100.5% | 102.3% |
| average | 0.0% | 0.0% | 0.0% | 0.0% | 0.0% | −0.3% | 99.7% | 101.4% | 102.5% |

Figure 3:
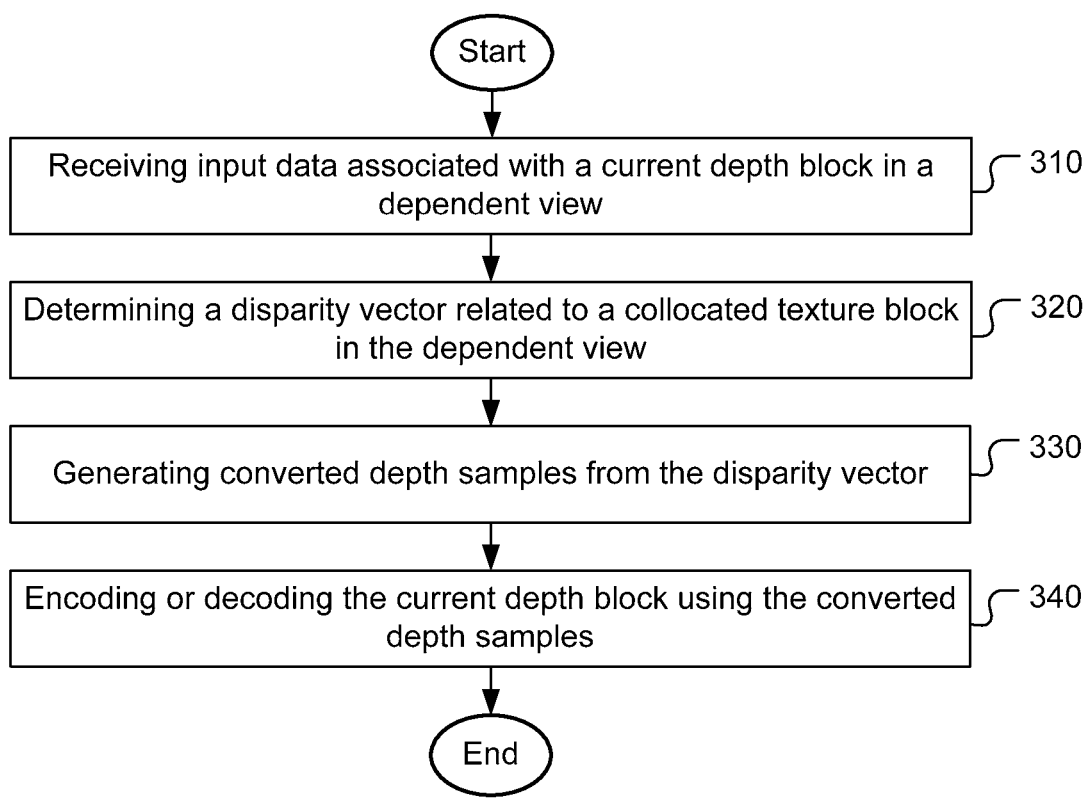
FIG. 3 illustrates an exemplary flowchart of depth coding incorporating disparity derived depth prediction according to an embodiment of the present invention.

FIG. 3 illustrates an exemplary flowchart of a three-dimensional encoding or decoding system incorporating disparity derived depth (DDD) prediction according to an embodiment of the present invention. The system receives input data associated with a current depth block in a dependent view in step 310. For encoding, the input data corresponds to depth data to be encoded. For decoding, the input data corresponds to coded depth data to be decoded. The input data may be retrieved from memory (e.g., computer memory, buffer (RAM or DRAM) or other media) or from a processor. A disparity vector related to a collocated texture block in the dependent view is determined in step 320. Converted depth samples are generated from the disparity vector in step 330. The current depth block are encoded or decoded using the converted depth samples in step 340.

The flowchart shown above is intended to illustrate examples of 3D or multi-view coding using disparity derived depth (DDD) prediction according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of depth coding for a three-dimensional coding system, the method comprising: receiving input data associated with a current depth block in a dependent view; determining a disparity vector related to a collocated texture block in the dependent view; generating converted depth samples from a disparity value of the disparity vector according to a predetermined function of the disparity value; and encoding or decoding the current depth block using the converted depth samples, wherein said generating the converted depth samples from the disparity vector includes multiplying the disparity value of the disparity vector by a first integer and adding a second integer to obtain a first result, and right shifting the first result by a third integer to generate the converted depth samples; wherein the right shifting the first result by the third integer to generate the converted depth samples comprises: right shifting the first result by the third integer to obtain to sign-modified converted depth samples, and multiplying the sign-modified converted depth samples by a sign part to obtain the converted depth samples.

2. The method of claim 1, wherein the converted depth samples are used as a predictor or a Merge candidate in a merging candidate list for the current depth block.

3. The method of claim 2, wherein the Merge candidate corresponding to the converted depth samples is placed in the merging candidate list at a location immediately after a texture merging candidate.

4. The method of claim 2, wherein the merging candidate list includes an additional texture merging candidate, wherein the additional texture merging candidate inherits motion parameters of texture data at a below-right location of the collocated texture block.

5. The method of claim 4, wherein the additional texture merging candidate is placed in the merging candidate list at a location before TMVP (temporal motion vector predictor) merging candidate.

6. The method of claim 1, wherein information associated with the function is signaled explicitly to a decoder or derived implicitly by the decoder.

7. The method of claim 1, wherein the sign part corresponds to a sign part of depth-conversion scale factor for depth-to-disparity conversion.

8. The method of claim 1, wherein the fourth first integer is determined based on a depth-conversion scale factor for depth-to-disparity conversion and the fourth first integer is selected to be 2 raised to a power of a seventh fourth integer.

9. The method of claim 8, wherein the fourth integer corresponds to a sum of an fifth integer and a sixth integer, wherein the fifth integer corresponds to data precision of the depth-conversion scale factor and the depth-conversion for the depth-to-disparity conversion, and the sixth integer corresponds to bit depth of depth samples of the current depth block.

10. The method of claim 8, wherein the third integer corresponds to a sum of the fourth integer, a seventh integer, and 1, wherein the seventh integer corresponds to a largest integer not greater than the depth-conversion scale factor for the depth-to-disparity conversion.

11. The method of claim 1, wherein the fifth second integer is determined based on both depth-conversion scale factor and depth-conversion offset for depth-to-disparity conversion.

12. The method of claim 1, wherein the first integer, the second integer and the third integer are signaled explicitly to a decoder or derived implicitly by the decoder.

13. The method of claim 1, wherein the converted depth samples are generated from the disparity vector without a division operation.

14. The method of claim 1, wherein information associated with the disparity vector is signaled explicitly to a decoder or derived implicitly by the decoder.

15. The method of claim 1, wherein the disparity vector related to the collocated texture block is determined from the disparity vector of a selected position of the collocated texture block corresponding to a center, left above, right bottom, right above or left bottom location of the collocated texture block.

16. The method of claim 1, wherein the disparity vector of the collocated texture block is a derived disparity vector based on neighboring block disparity vector (NBDV) or depth-oriented NBDV (DoNBDV) of the collocated texture block.

17. The method of claim 1, wherein the current depth block is further divided into depth sub-blocks, and for each depth sub-block, the converted depth samples generated from the disparity vector of a corresponding sub-block of the collocated texture block are used as a predictor for the depth sub-block.

18. An apparatus for depth coding in a three-dimensional coding system, the apparatus comprising one or more electronic circuits configured to: receive input data associated with a current depth block in a dependent view; determine a disparity vector related to a collocated texture block in the dependent view; generate converted depth samples from a disparity value of the disparity vector according to a predetermined function of the disparity value; and encode or decode the current depth block using the converted depth samples, wherein the one or more electronic circuits are configured to generate the converted depth samples from the disparity vector by multiplying the disparity value of the disparity vector by a first integer and adding a second integer to obtain a first result, and right shifting the first result by a third integer to generate the converted depth samples; wherein the one or more electronic circuits are configured to generate the converted depth samples from the disparity vector by right shifting the first result by the third integer to obtain sign-modified converted depth samples, and multiplying the sign-modified converted depth samples by a sign part to obtain the converted depth samples.

* * * * *